US 6,721,743 B1

(12) United States Patent
Sakakibara

(10) Patent No.: US 6,721,743 B1
(45) Date of Patent: Apr. 13, 2004

(54) VALUE POINTS EXCHANGING MANAGING METHOD AMONG FIRST AND SECOND BUSINESS ENTITIES WHERE VALUE POINTS AVAILABLE TO ON-LINE CUSTOMER OBTAINING GOODS OR SERVICES

(75) Inventor: Hisashi Sakakibara, Osaka (JP)

(73) Assignee: AD. Ken Corporation, Osaka (JP)

( * ) Notice: Subject to any disclaimer, the term of this patent is extended or adjusted under 35 U.S.C. 154(b) by 472 days.

(21) Appl. No.: 09/632,586

(22) Filed: Aug. 4, 2000

(30) Foreign Application Priority Data

Mar. 24, 2000 (JP) ........................................ 2000-085057

(51) Int. Cl.[7] ............................................. G06F 17/30
(52) U.S. Cl. ........................... 707/10; 707/102; 705/14; 705/26; 705/37; 705/39; 709/217
(58) Field of Search .................... 707/1–10, 100–104.1, 707/200–205, 501.1, 512–514; 709/203–210, 217–219; 705/1–15, 25–37, 39, 400; 713/200–202

(56) References Cited

U.S. PATENT DOCUMENTS

| 5,839,114 | A | * | 11/1998 | Lynch et al. ............... 705/5 |
| 6,029,141 | A | * | 2/2000 | Bezos et al. ................ 705/27 |
| 6,178,408 | B1 | * | 1/2001 | Copple et al. ............... 705/14 |
| 6,249,769 | B1 | * | 6/2001 | Ruffin et al. ................ 705/7 |
| 6,327,573 | B1 | * | 12/2001 | Walker et al. ............... 705/14 |
| 6,351,738 | B1 | * | 2/2002 | Clark .......................... 705/37 |
| 6,381,585 | B1 | * | 4/2002 | Maples et al. ............... 705/36 |
| 6,405,175 | B1 | * | 6/2002 | Ng ............................... 705/14 |
| 6,424,949 | B1 | * | 7/2002 | Deaton et al. ............... 705/14 |
| 6,424,951 | B1 | * | 7/2002 | Shurling et al. ............ 705/14 |

FOREIGN PATENT DOCUMENTS

| EP | 0992952 | * | 10/1999 | ...................... 7/8 |
| EP | 1172744 A1 | * | 1/2002 | ............ G06F/17/60 |
| JP | 10-97575 | | 4/1998 | ............ G06F/17/60 |
| JP | 10-254968 | | 9/1998 | |
| JP | 2000-20552 | | 1/2000 | ............ G06F/17/30 |
| WO | WO9103789 | * | 3/1991 | .................... 15/21 |
| WO | WO 98/29822 | * | 7/1998 | .................... 17/60 |
| WO | WO 99/03053 | * | 1/1999 | .................... 17/60 |

* cited by examiner

Primary Examiner—Srirama Channavajjala
(74) Attorney, Agent, or Firm—Staas & Halsey LLP

(57) ABSTRACT

A customer-use terminal unit 20 managed by a customer transmits exchange instructing information, which instructs an exchange of valuable points obtained by the customer for communication points used for receiving on-line services, to a central unit 10 that manages the communication points (S202). The central unit 10 transmits valuable point request information according to the received exchange instructing information to a cooperate-use terminal unit 30 that manages the valuable points (S204). The cooperate-use terminal unit 30 transmits valuable points corresponding to the received valuable point request information to the central unit 10 (S206). The central unit 10 exchanges the received valuable points for communication points according to a predetermined exchange rate (S209). Accordingly, it is possible to achieve point management capable of reducing the loss of valuable points given to the customer as a reward for consumption activity, due to the expiration of the term of validity of the valuable points, and improving the frequency in use of on-line services.

10 Claims, 11 Drawing Sheets

FIG. 3

| CUSTOMER ID | COMMUNICATION POINT | |
|---|---:|---|
| ID00001 | 10,050 | |
| ID00002 | 300 | |
| ID00003 | 40,200 | |
| ⋮ | ⋮ | |

F I G. 4

| NAME | RATE |
|---|---|
| ××CARD | 0. 42 |
| △△AIR LINE | 0. 66 |
| □□BOOK SHOP | 1. 00 |
| ⋮ | ⋮ |

FIG. 5

| NAME | PERSONAL INFORMATION | | | | 1st IDENTIFICATION INFORMATION | |
| --- | --- | --- | --- | --- | --- | --- |
| | BIRTHDAY | SEX | ADD. | | ID No. | PASSWORD |
| ○○×× | 1960/03/23 | M | OSAKA… | | ID00001 | ××××× |
| △△□ | 1980/09/09 | F | KOBE… | | ID00002 | ××××× |
| ××△△ | 1973/12/24 | M | KYOTO… | | ID00003 | ××××× |
| … | … | | | | … | … |

FIG. 6

| 2nd IDENTIFICATION INFORMATION | VALUABLE POINT |
|---|---|
| MEMBERSHIP No. | |
| AD100020 | 2,000 |
| AD100021 | 50 |
| AD100022 | 15,500 |
| ⋮ | ⋮ |

FIG. 9

| NAME | MEMBERSHIP No. | VALUABLE POINT | EXCHANGE? | COMMUNI-CATION POINTS |
|---|---|---|---|---|
| | ID No. | ID00001 | | |
| | PASSWORD | ****** | | |
| xxCARD | AD100020 | 2,000 | ⊙Yes ○No | 840 |
| △△AIR LINE | JL32D54 | 10,000 | ○Yes ○No | |
| □□BOOK SHOP | | | ○Yes ○No | |
| ○○ELECTRIC | | | ○Yes ○No | |
| ... | ... | ... | ... | ... |

TOTAL COMMUNICATION POINTS  1,240 pts

[TRANSMIT INFO.]  [CLEAR]

VALUE POINTS EXCHANGING MANAGING METHOD AMONG FIRST AND SECOND BUSINESS ENTITIES WHERE VALUE POINTS AVAILABLE TO ON-LINE CUSTOMER OBTAINING GOODS OR SERVICES

BACKGROUND OF THE INVENTION

The present invention relates to a point managing method for managing various points such as communication points used for receiving on-line services, a point managing system that employs the method, a central unit for use in the system, and a recording medium on which a program for realizing the device is recorded.

With the development of communication networks such as the Internet, businesses that provide various services, such as giving communication points used for charged or free on-line services to customers and providing on-line games and on-line shopping according to the given points, have been increasing.

Moreover, various service providers and various retail shops, which give valuable points as rewards for using transportation facilities, such as an air line, and for consumption activity, such as purchasing products, and provide various products and services in exchange for the valuable points when the amount of given valuable points reaches a predetermined value, are popularized.

However, when the amount of points given as a reward for consumption activity does not reach the predetermined value that gives a chance to exchange the points for products and services, these points are useless and the term of validity of the points sometimes expires before exchanging the points for products and services.

Since the services of giving valuable points as a reward for consumption activity are provided by many service providers and retail shops, there is a circumstance that the consumers have difficulty in remembering which service providers and retail shops they use as customers (members). In such a circumstance, there is a possibility that the expiry date of the valuable points passes before the consumers notice the given valuable points.

Furthermore, there is such a problem that the service providers and retail shops have disadvantages from the viewpoint of the taxation system because the valuable points that are not exchanged for products and services are counted as profits on the account books.

Besides, there are objectives to be achieved by a business entity which provides various services according to communication points that the number of customers must be increased and the frequency in use of services must be improved.

BRIEF SUMMARY OF THE INVENTION

The present invention has been made in view of the above circumstances, and a main object of the present invention is to provide a point managing system which enables a customer to effectively use valuable points without considering the term of validity by exchanging the valuable points for communication points by a preset exchange rate according to an instruction from the customer, enables a business entity that provides various services in exchange for communication points to obtain new customers and achieve an improvement in the frequency in use of services, and prevents service providers and retail shops that manage the valuable points from having disadvantages from the viewpoint of the taxation system; a point managing system employing the method; a central unit for use in the system; and a recording medium on which a program for realizing the device is recorded.

Another object is to provide a point managing method, point managing system, central unit and recording medium capable of confirming the status of obtained valuable points and exchanging the valuable points for communication points by transmitting identification information such as a membership number given from a business entity who provides valuable points to a central unit managed by a service provider who manages communication points, and thereby unitarily managing the valuable points so that valuable points do not fall into oblivion.

A point managing method according to the first invention, which is a method for managing points among a first business entity, a second business entity who cooperates with the first business entity and customers of the first and second business entities, the first business entity managing communication points used for on-line services, the second business entity managing valuable points given to customers as a reward for consumption activity, the method comprising the steps of: instructing the first business entity by the customer to exchange valuable points for communication points; requesting the second business entity by the first business entity to send valuable points given to the customer, according to the instruction; sending requested valuable points by the second business entity to the first business entity; and exchanging received valuable points for communication points by the first business entity, according to a preset exchange rate.

The point managing method according to the first invention enables the customer to extend the substantial term of validity of valuable points whose expiry date is approaching by exchanging the valuable points for communication points by a preset exchange rate according to the instruction from the customer and enables the customer to effectively use various valuable points of small values which are useless as individuals by adding up these valuable points for a single communication point, thereby accelerating the spread of communication points. Hence, the first business entity can obtain new customers and achieve an improvement in the frequency in use of services. Moreover, by introducing a business mode in which the charge of services calculated according to the exchange rate is paid from the second business entity to the first business entity, the second business entity can limit profits derived from the expiration of the term of validity of valuable points on an account book and consequently can never have disadvantages from the viewpoint of the taxation system.

A point managing system according to the second invention, which is a point managing system comprising a central unit for managing communication points used for on-line services, a cooperate-use terminal unit that is connected to the central unit and manages valuable points representing a reward for consumption activity, and a customer-use terminal unit that is connected to the central unit, wherein the customer-use terminal unit comprises a controller capable of performing the operation of transmitting to the central unit exchange instructing information instructing an exchange of valuable points for communication points, the central unit comprises: a communication point database that records information related to communication points; an exchange database that records information related to an exchange rate between communication points and valuable points; and a controller capable of performing the operation of transmitting to the cooperate-use terminal unit valuable point request information requesting valuable points corresponding to the customer-use terminal unit according to received exchange instructing information; and the cooperate-use terminal unit comprises: a valuable point database that records information related to valuable points; a controller capable of performing the following operations: transmitting to the central unit valuable points corresponding to received valuable point request information; and updating the valuable point database according to the transmitted valuable points; and the controller of the central unit further capable of performing following operations: exchanging received valuable points for communication points according to an exchange rate recorded in the exchange database; and updating the communication point database according to the exchanged communication points.

The point managing system according to the second invention enables the customer to extend the substantial term of validity of valuable points whose expiry date is approaching by exchanging the valuable points for communication points by a preset exchange rate according to the exchange instructing information received from the customer-use terminal unit and enables the customer to effectively use various valuable points of small values which are useless as individuals by adding up these valuable points for a single communication point, thereby accelerating the spread of communication points. Hence, the first business entity who manages the central unit can obtain new customers and achieve an improvement in the frequency in use of services. Moreover, by introducing a business mode in which the charge of services calculated according to the exchange rate is paid to the first business entity from the second business entity who manages the cooperate-use terminal unit, the second business entity can limit profits derived from the expiration of the term of validity of valuable points on an account book and consequently can never have disadvantages from the viewpoint of the taxation system.

A point managing system according to the third invention is characterized in the system of the second invention that: the controller of the customer-use terminal unit further capable of performing following operations: accepting input of first identification information related to customers and second identification information that is different from the first identification information; and transmitting the first and second identification information to the central unit; the controller of the central unit further capable of performing the following operations: authenticating the customer-use terminal unit based on received first identification information; and transmitting received second identification information to the cooperate-use terminal unit; the valuable point database provided in the cooperate-use terminal unit stores valuable points recorded to correspond to the second identification information, and the controller of the cooperate-use terminal unit further capable of performing the operation of extracting from the valuable point database valuable points to be transmitted to the central unit, according to received second identification information.

In the point managing system according to the third invention, by performing authentication based on the first identification information such as an ID number and a password given to a customer from the first business entity to ensure safety and then transmitting to the central unit the second identification information such as a membership number given to the customer from the second business entity, it is possible to confirm the status of obtained valuable points corresponding to the second identification information and exchange the valuable points for communication points. It is therefore possible to unitarily mange the valuable points through the central unit, improve the convenience of the customer, and prevent the valuable points from falling into oblivion.

A central unit according to the fourth invention, which is connected to a cooperate-use terminal unit for managing valuable points representing a reward for consumption activity and a customer-use terminal unit, for managing communication points used for on-line services, comprising: a communication point database that records information related to communication points; an exchange database that records information related to an exchange rate between communication points and valuable points; and a controller, coupled to the communication point database and said exchange database, and capable of performing the following operations: when exchange instructing information instructing an exchange of valuable points for communication points is received, for transmitting to the cooperate-use terminal unit valuable point request information requesting valuable points corresponding to the customer-use terminal unit according to the received exchange instructing information; when valuable points corresponding to the transmitted valuable point information are received, for exchanging the received valuable points for communication points according to an exchange rate recorded in the exchange database; and updating the communication point database according to the exchanged communication points.

The central unit according to the fourth invention enables the customer to extend the substantial term of validity of valuable points whose expiry date is approaching by exchanging valuable points for communication points by a preset exchange rate according to the exchange instructing information received from the customer-use terminal unit and enables the customer to effectively use various valuable points of small values which are useless as individuals by adding up these valuable points for a single communication point, thereby accelerating the spread of communication points. Hence, the first business entity who manages the central unit can obtain new customers and achieve an improvement in the frequency in use of services. Moreover, by introducing a business mode in which the charge of services calculated according to the exchange rate is paid to the first business entity from the second business entity who manages the cooperate-use terminal unit, the second business entity can limit profits derived from the expiration of the term of validity of valuable points on an account book and consequently can never have disadvantages from the viewpoint of the taxation system.

A computer readable recording medium according to the fifth invention, which is a computer readable recording medium including thereon a recorded computer program for causing a computer having communication means to manage communication points used for on-line services, comprising: computer readable program code means, when exchange instructing information instructing an exchange of valuable points representing a reward for consumption activity for communication points is received, for causing a computer to transmit valuable point request information requesting valuable points to the communication means corresponding to the requested valuable points, according to the exchange instructing information; and computer readable program code means, when valuable points corresponding to the transmitted valuable point request information are received, for causing a computer to exchange the received valuable points for communication points according to a preset exchange rate.

The computer readable recording medium according to the fifth invention can extend the substantial term of validity of valuable points whose expiry date is approaching by exchanging the valuable points for communication points by a preset exchange rate according to the exchange instructing information by the execution of the recorded program on the computer and enables an effective use of various valuable points of small values which are useless as individuals by adding up these valuable points for a single communication point, thereby accelerating the spread of communication points. Hence, the first business entity who manages the central unit can obtain new customers and achieve an improvement in the frequency in use of services. Moreover, by introducing a business mode in which the charge of services calculated according to the exchange rate is paid to the first business entity from the second business entity who manages the communication device, the second business entity can limit profits derived from the expiration of the term of validity of valuable points on an account book and consequently can never have disadvantages from the viewpoint of the taxation system.

The above and further objects and features of the invention will more fully be apparent from the following detailed description with accompanying drawings.

BRIEF DESCRIPTION OF THE SEVERAL VIEWS OF THE DRAWINGS

FIG. 3 is a conceptual view showing the recorded contents of a communication point database provided in a central unit of the present invention;

FIG. 4 is a conceptual view showing the recorded contents of an exchange database provided in the central unit of the present invention;

FIG. 5 is a conceptual view showing the recorded contents of a customer information database provided in the central unit of the present invention;

FIG. 6 is a conceptual view showing the recorded contents of a valuable point database provided in a cooperate-use terminal unit for use in the point managing system of the present invention;

FIG. 9 is an explanatory view showing a Web page outputted from the customer-use terminal unit for use in a point managing system of the present invention.

DETAILED DESCRIPTION OF THE INVENTION

The following description will explain the present invention with reference to the drawings illustrating an embodiment thereof.

Figure 1:
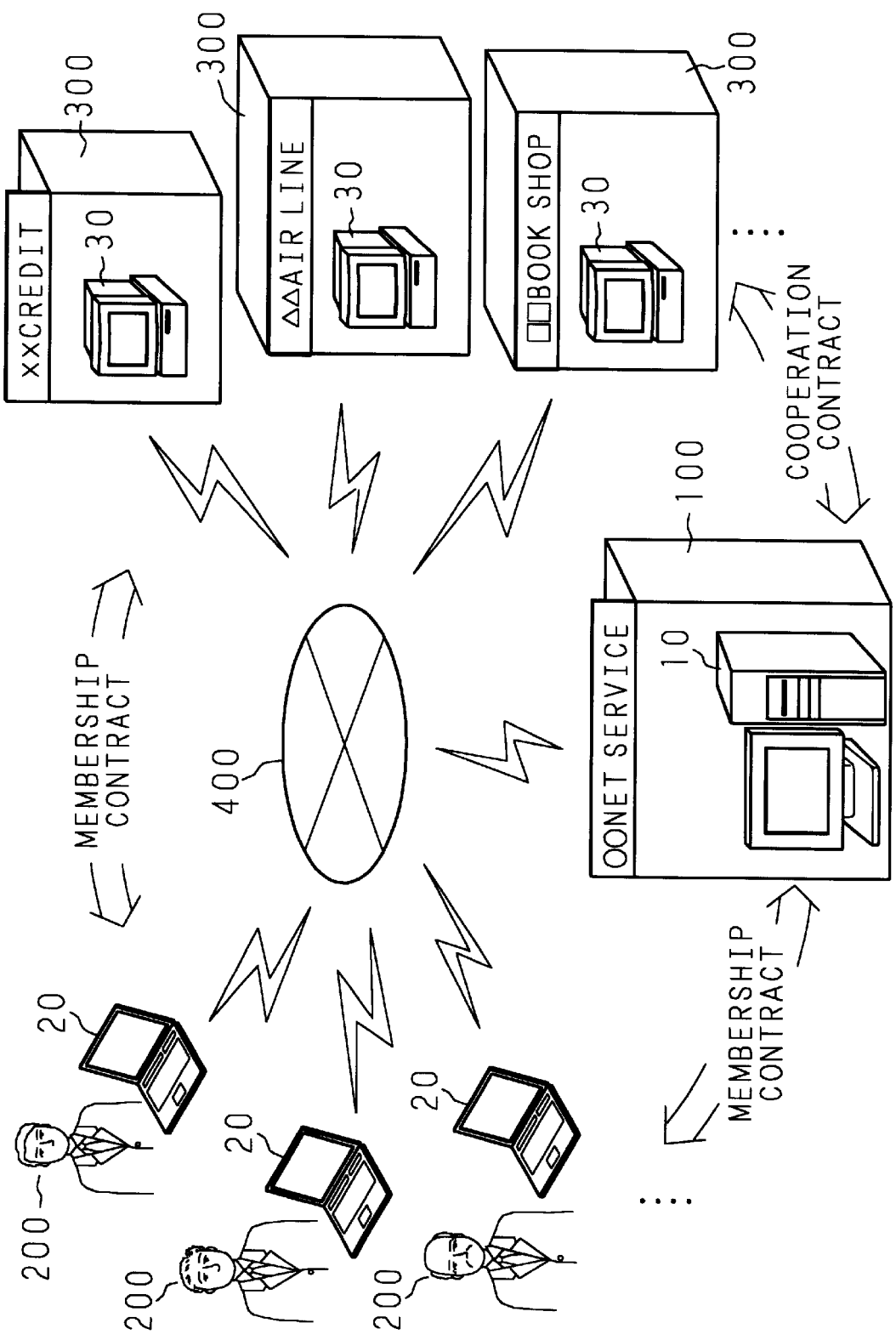
FIG. 1 is an explanatory view showing the concept of a point managing system of the present invention.
Figure 2:
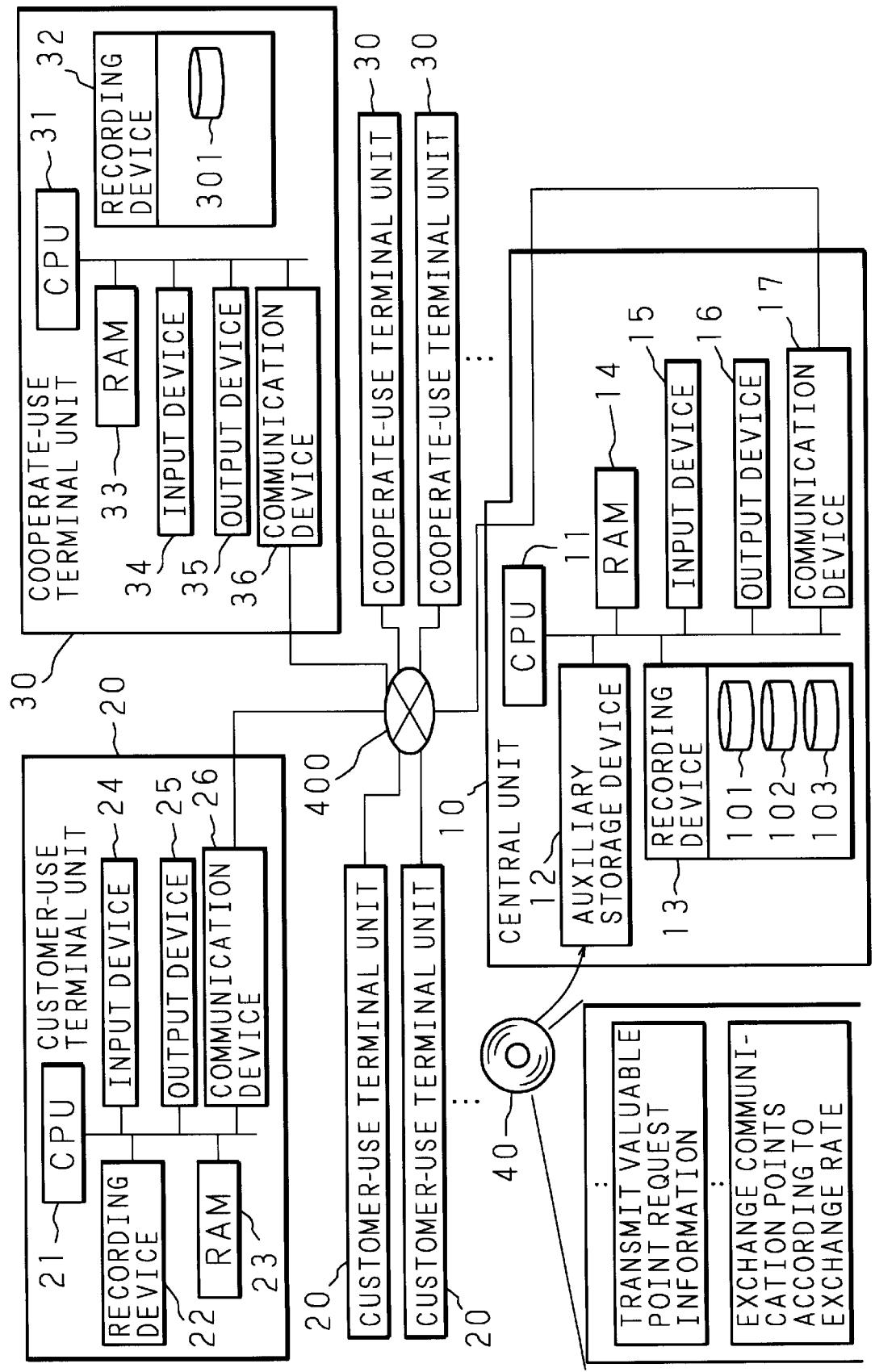
FIG. 2 is a block diagram showing the structure of the point managing system of the present invention.

FIG. 1 is an explanatory view showing the concept of a point managing system of the present invention, and FIG. 2 is a block diagram showing the structure of the point managing system of the present invention.

In the drawings, numeral 10 denotes a central unit of the present invention using a WWW server computer. The central unit 10 is managed by a first business entity 100 that provides on-line services such as on-line shopping and on-line games performed on a communication network 400 such as the Internet.

For the on-line services, communication points are used as virtual money which can be used only on the communication network 400. The communication points are given for pay or free of charge from the first business entity 100 to customers 200 as the members using the on-line services, and managed by the central unit 10.

The customers 200 are connected to the communication network 400 through customer-use terminal units 20 such as personal computers, and also have a membership to point services provided by various second business entities 300 that serve valuable points which are exchangeable for various products and services as a reward for consumption activity such as the use of transportation facilities including an air line and purchasing of products in addition to on-line services.

The first business entity 100 and second business entities 300 made a business cooperation contract with each other, and the second business entities 300 are connected to the communication network 400 through cooperate-use terminal units 30.

The central unit 10 includes an auxiliary storage device 12 such as a CD-ROM drive for reading information including programs and data from a recording medium 40 such as a CD-ROM on which information including programs and data for the central unit 10 of the present invention is recorded, and a recording device 13 such as a hard disk for recording thereon the information including programs and data read by the auxiliary storage device 12.

By reading the information including programs and data from the recording device 13, storing the information in a RAM 14 for storing information and executing the information by a CPU 11, the WWW server computer is operated as the central unit 10 of the present invention.

Additionally, parts of a recording area of the recording device 13 is allotted as a communication point database 101 that records information related to communication points, an exchange database 102 that records information related to an exchange rate of communication points and various valuable exchange points managed by the second business entities 300, and a customer information database 103 that records information related to the customers 200. Furthermore, Web pages described in program languages such as HTML (Hyper Text Markup Language) are recorded.

In addition, the central unit 10 includes an input device 15 such as a mouse and a keyboard, an output device 16 such as a monitor and a printer, and a communication device 17 that is connected to the communication network 400 to send and receive information to/from other devices.

FIG. 3 is a conceptual view showing the recorded contents of the communication point database 101 provided in the central unit 10 of the present invention. In the communication point database 101, information related to the communication points is stored as a record including data of items such as a customer ID that identifies the customer 200 and communication points given to the customer 200.

FIG. 4 is a conceptual view showing the recorded contents of the exchange database 102 provided in the central unit 10 of the present invention. In the exchange database 102, data indicating the exchange rates between the valuable exchange points and the communication points managed by the respective second business entities 300 are recorded in the items showing the names of the respective second business entities 300 (or the common names of provided services).

Incidentally, the recorded exchange rates are values set according to the contents of the contracts made between the first business entity 100 and the respective second business entities 300.

FIG. 5 is a conceptual view showing the recorded contents of the customer information database 103 provided in the central unit 10 of the present invention. In the customer information database 103, the information related to a customer 200 is stored as a record including data in the items such as personal information including the name, date of birth, sex distinction and address of the customer 200, and the first identification information including the ID number and password that identify the customer 200.

The customer-use terminal unit 20 has substantially the same structure as the central unit 10, and includes a CPU 21, a recording device 22, a RAM 23, an input device 24, an output device 25, and a communication device 26. In the recording device 22, information including various programs, such as a browsing software program (hereinafter referred to as the browser) for browsing Web pages, and data is recorded. By activating the browser and inputting a URL (Uniform Resource Locator) specifying a Web page recorded in the central unit 10 in a predetermined area displayed on the output device 25, it is possible to access the Web page recorded in the central unit 10.

The cooperate-use terminal unit 30 has substantially the same structure as the central unit 10, and includes a CPU 31, a recording device 32, a RAM 33, an input device 34, an output device 35, and a communication device 36. A part of the recording area of the recording device 32 is allotted as a valuable point database 301 that records information related to valuable points.

FIG. 6 is a conceptual view showing the recorded contents of the valuable point database 301 provided in the cooperate-use terminal unit 30 for use in the point managing system of the present invention. In the valuable point database 301, information related to valuable points is stored as a record having data in the items such as second identification information including a membership number given to a customer by the second business entity 300 and valuable points given to the customer 200 as a reward for consumption activity.

Figure 7A:
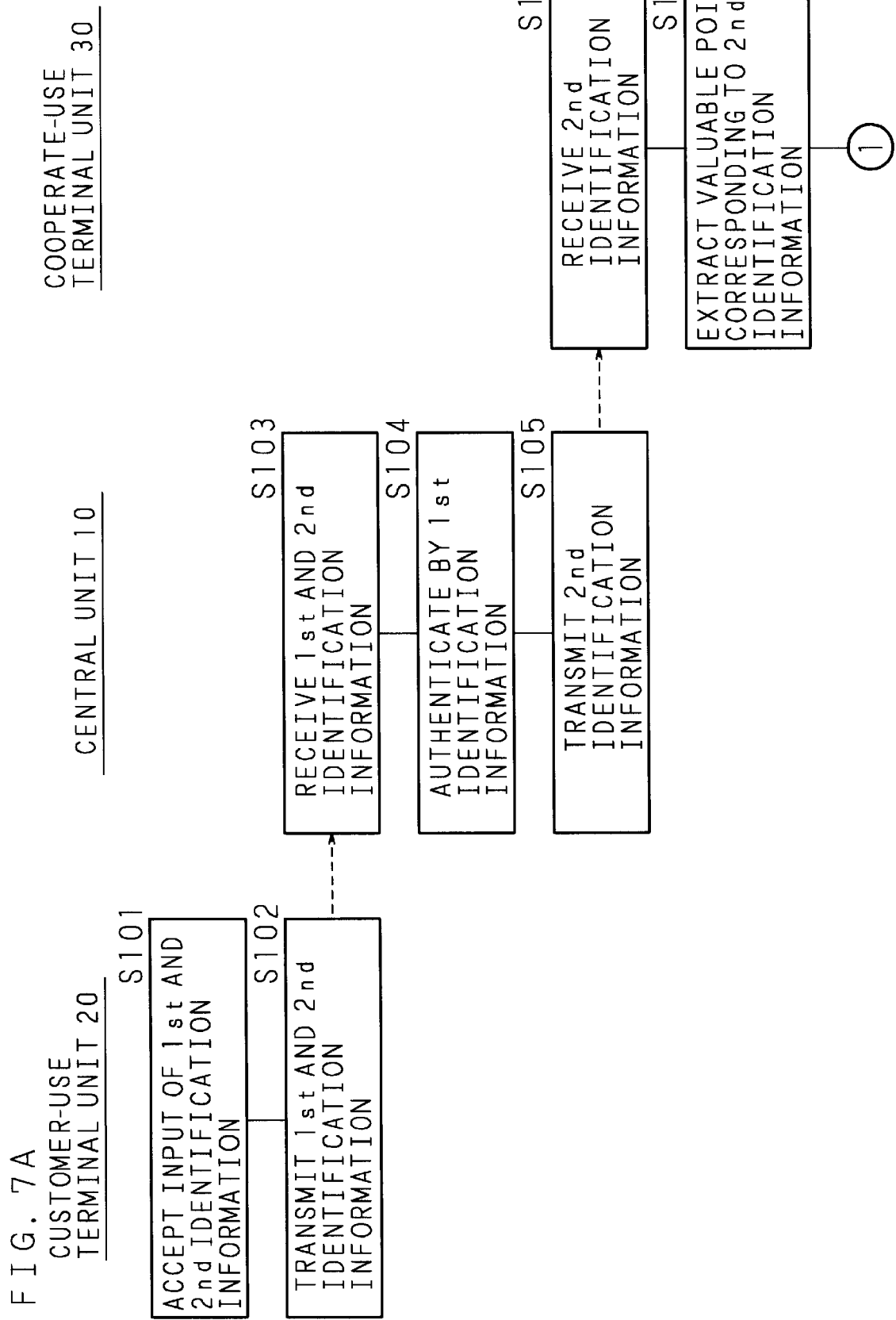
FIG. 7A and FIG. 7B are flow charts showing a valuable point confirmation process performed by the central unit, customer-use terminal unit and cooperate-use terminal unit for use in the point managing system of the present invention.
Figure 7B:
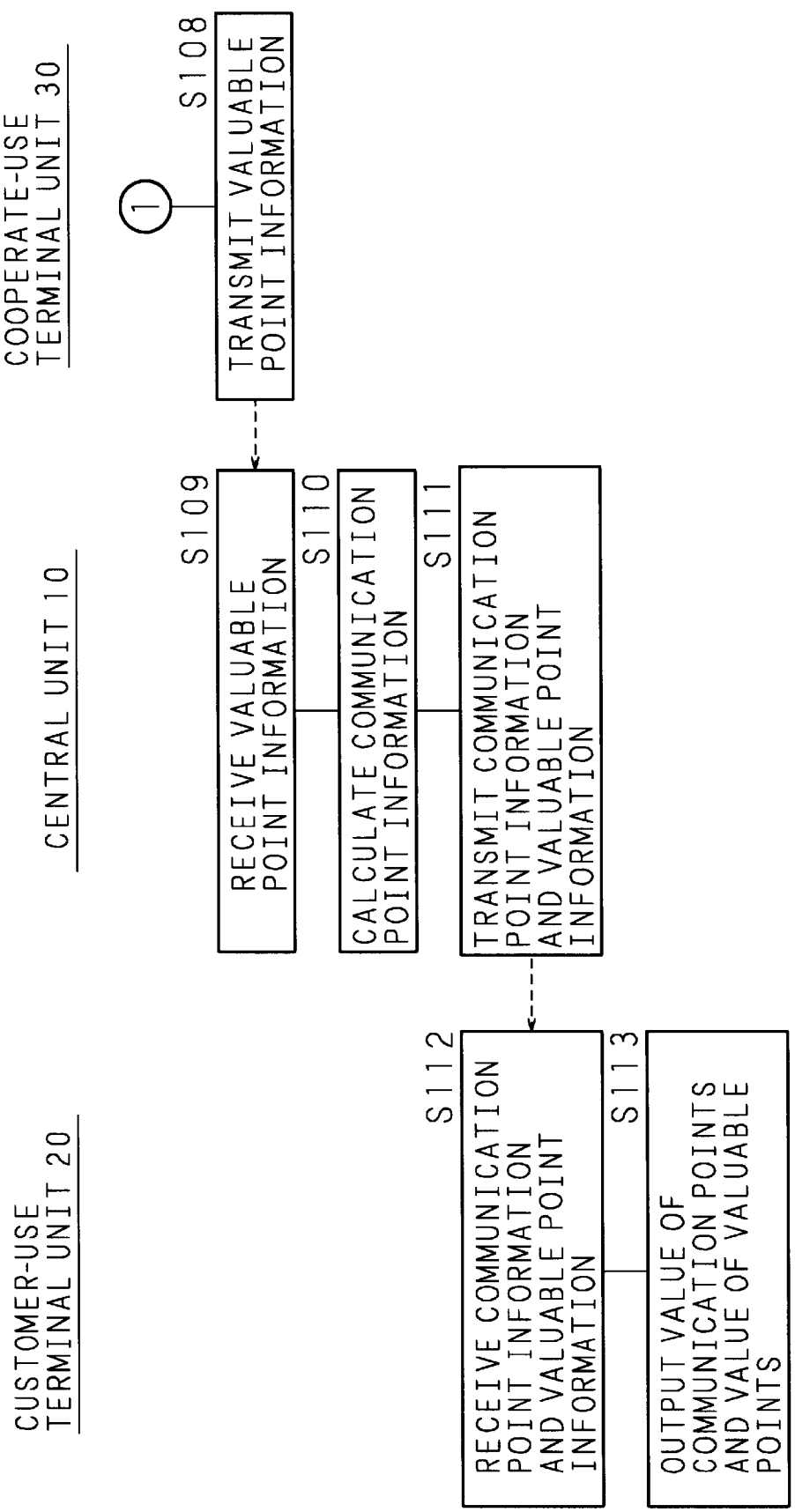

Next, referring to the flow charts of FIG. 7A and FIG. 7B showing a valuable point authentication process performed by the central unit 10, customer-use terminal unit 20 and cooperate-use terminal unit 30 for use in the point managing system of the present invention.

The customer 200 accesses a Web page recorded in the central unit 10 by connecting the customer-use terminal unit 20 to the communication network 400, activating the browser, and inputting the URL.

Then, the customer 200 inputs the first identification information in a predetermined space on the outputted Web page, and inputs the second identification information in a predetermined space of a section indicating a second business entity 300 that confirms the status of obtained points and manages valuable exchange points desired to be exchanged for communication points.

The terminal unit 20 accepts the input of the first and second identification information (S101), and transmits the accepted first and second identification information to the central unit 10 (S102).

The central unit 10 receives the first and second identification information (S103), and performs authentication by collating the received first identification information and the first identification information recorded in the customer information database 103 (S104).

By performing the authentication process in such a manner, the customer 200 can use the point exchange system of the present invention. Moreover, when it is confirmed that the first identification information is wrong as a result of the collation, the central unit 10 performs a predetermined abnormal process to request the customer 200 to input the first identification information again.

Then, the central unit 10 transmits the received second identification information to a cooperate-use terminal unit 30 corresponding to the second identification information (S105).

The cooperate-use terminal unit 30 receives the second identification information (S106), extracts valuable points corresponding to the second identification information from the valuable point database 301 according to the received second identification information (S107), and transmits valuable point information indicating the value of the extracted valuable points to the central unit 10 (S108).

In the cooperate-use terminal unit 30, in the event of confirming and exchanging the valuable points, when personal information such as the name and date of birth of the customer 200 is required in addition to the second identification information, the personal information recorded in the customer information database 103 is automatically transmitted from the central unit 10 to the cooperate-use terminal unit 30. Therefore, the customer 200 can confirm and exchange the valuable exchange points by only inputting the second identification information.

The central unit 10 receives the valuable point information (S109), calculates communication point information indicating a value of communication points exchanged for valuable points from a value indicated by the received valuable point information according to an exchange rate recorded in the exchange database 102 (S110), and transmits the calculated communication point information and valuable point information to the customer-use terminal unit 20 (S111).

The customer-use terminal unit 20 receives the communication point information and valuable point information (S112), and outputs the value of the communication points indicated by the received communication point information and the value of the valuable points indicated by the received valuable point information (S113).

Figure 8A:
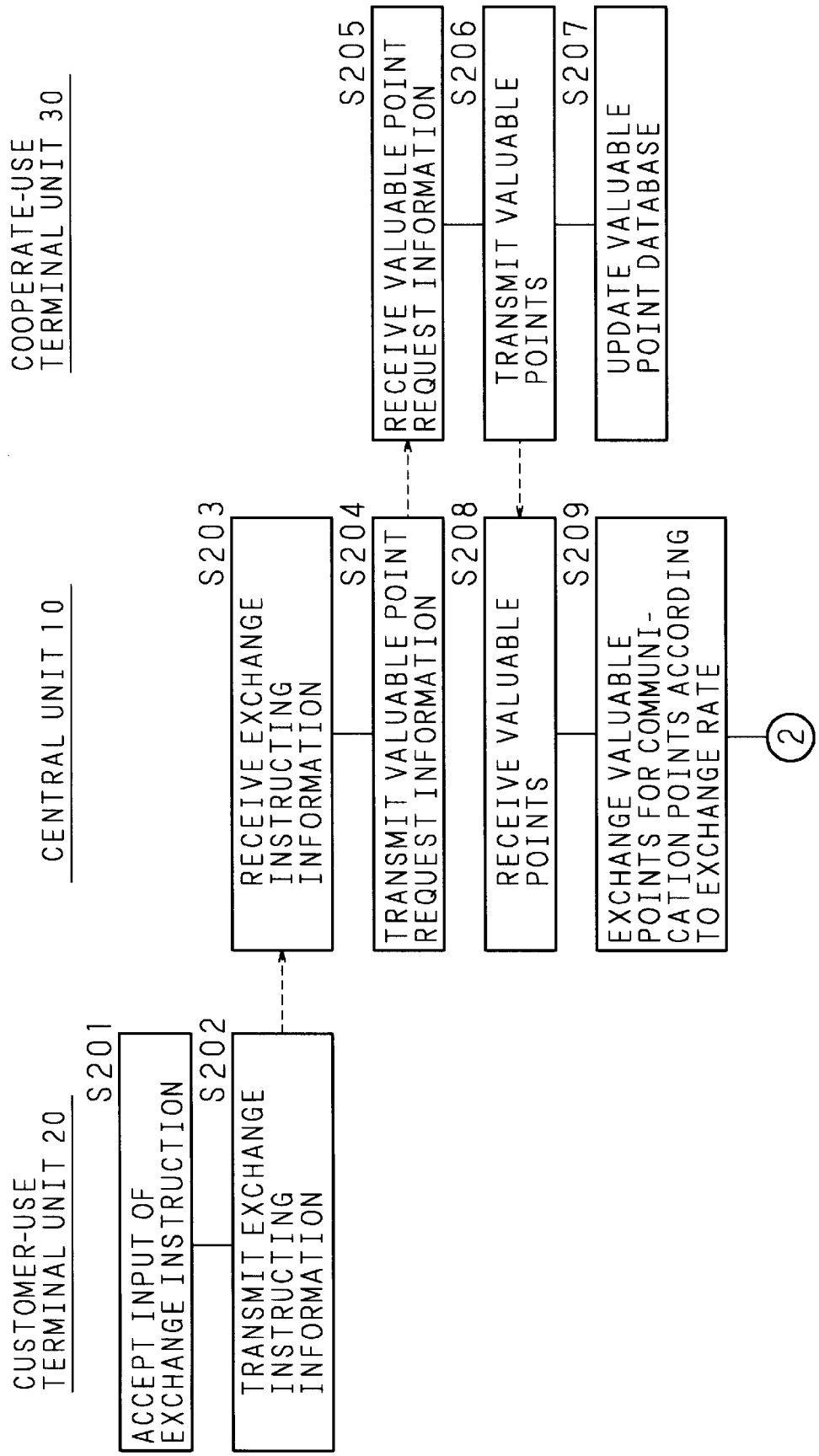
FIG. 8A and FIG. 8B are flow charts showing a communication point exchange process performed by the central unit, customer-use terminal unit and cooperate-use terminal unit for use in the point managing system of the present invention.
Figure 8B:
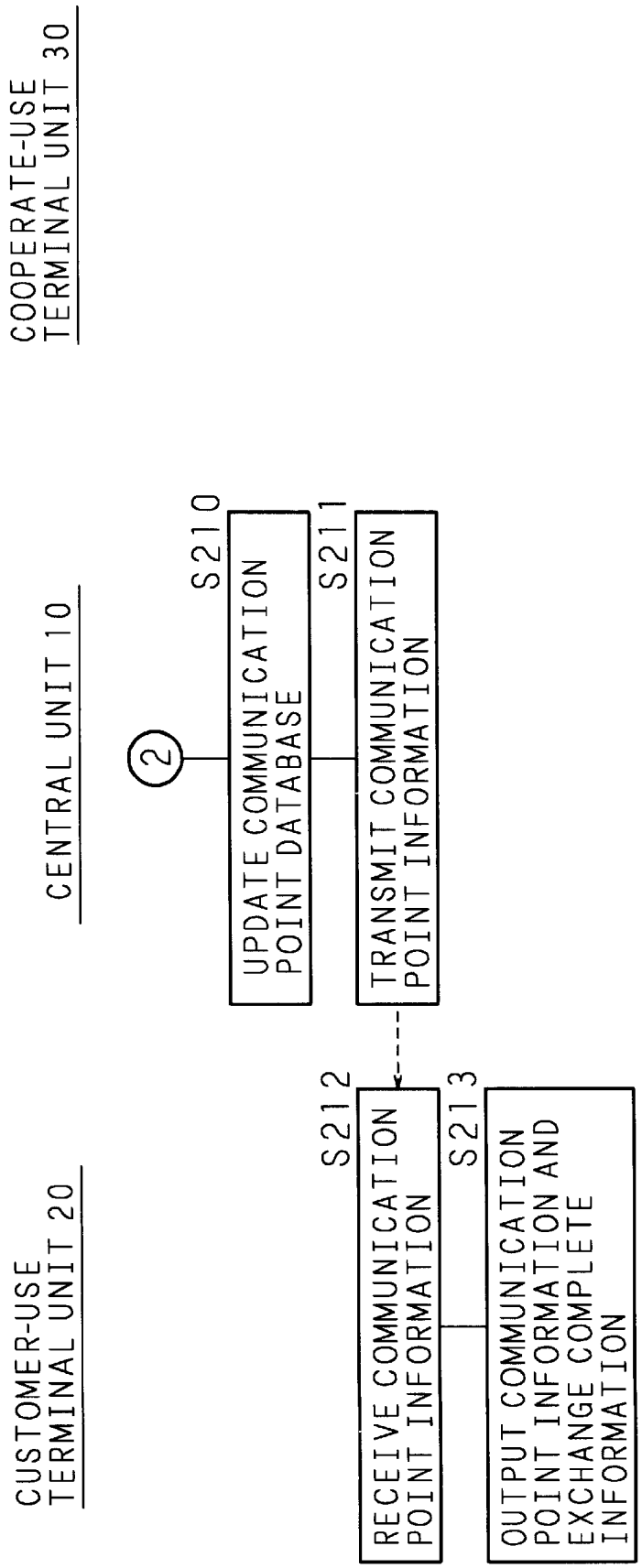

Next, referring to the flow charts shown in FIG. 8A and FIG. 8B, the following description will explain a communication point exchange process performed by the central unit 10, customer-use terminal unit 20 and cooperate-use terminal unit 30 for use in the point managing system of the present invention.

The customer 200 confirms the values of the communication points and valuable points outputted in step S113, and inputs an exchange instruction when the exchange of the valuable points for the communication points is desired.

The customer-use terminal unit 20 accepts the input of the exchange instruction (S201), and transmits exchange instructing information showing the accepted exchange instruction to the central unit (S202).

The central unit 10 receives the exchange instructing information (S203), and transmits valuable point request information requesting valuable points to the cooperate-use terminal unit 30 according to the received exchange instructing information (S204).

The cooperate-use terminal unit 30 receives the valuable point request information (S205), transmits valuable points corresponding to the received valuable point request information to the central unit 10 (S206), and updates the valuable point database 301 according to the transmitted valuable points (S207).

Incidentally, it has been described that the valuable points are transmitted in step S206. In this step, the cooperate-use terminal unit 30 performs the process of transmitting the valuable point information indicating the value of the valuable points in the same manner as in step S108.

The central unit 10 receives the valuable points (S208), exchange the received valuable points for communication points according to the exchange rate recorded in the exchange database 102 (S209), updates the communication point database 101 according to the exchanged communication points (S210), and transmits the communication point information indicating the value of the exchanged communication points to the customer-use terminal unit 20 (S211).

The customer-use terminal unit 20 receives the communication point information (S212), and outputs the received communication point information and exchange complete information indicating the completion of the exchange (S213).

Besides, when the: customer 200 exchanges the valuable points for communication points, a settlement process is performed. In the settlement process, the second business entity 200 pays the first business entity 100 the charge for using services which is calculated based on the exchanged valuable points and the exchange rate.

FIG. 9 is an explanatory view showing a Web page outputted from the customer-use terminal unit 20 for use in the point managing system of the present invention. As shown in FIG. 9, spaces for inputting an ID number and a password as the first identification information are displayed in the upper part of the screen outputted as a Web page. Moreover, in spaces indicating the second business entities 300 located below the spaces for the first identification information, the items showing the names of the second business entities 300 (or the common names of provided services), the membership number indicating the second identification information, valuable points, check buttons for specifying whether exchanging is carried out and communication points are provided for the output or input of the respective data. In further lower positions, a box for outputting the total amount of communication points and an information transmission button are displayed.

The customer 200 inputs data in the items that present the second identification information corresponding to valuable points which are to be confirmed and/or desired to be exchanged, checks "Yes" in the check button indicating whether exchanging is carried out by the use of the input device (mouse) 15, and clicks the lower information transmission button located in a lower position so as to execute the input of the exchange instruction.

In this case, instead of exchanging all the valuable points, part of the obtained valuable points may be exchanged by inputting a desired value.

Moreover, in the item showing the valuable points and the item showing the communication points, the value of the valuable points indicated by the received valuable point information and the value of the communication points indicated by the received communication point information are outputted, and a value indicating the total amount of communication points is outputted from a box that outputs the total amount of communication points as the exchange complete information.

The above-described embodiment illustrates a mode in which the first business entity solely provides on-line services. However, it is not necessarily to provide on-line services by a sole provider. In other words, it is possible to provide various on-line services by a plurality of cooperating providers and perform centralized management of the communication points serving as virtual money common to various on-line services by the central unit, and thereby increasing the range of on-line services provided for the customers.

Furthermore, although the above-described embodiment illustrates a mode in which an instruction to exchange valuable points for communication points is given after confirming the valuable points, the present invention is not necessarily limited to this mode. In other words, the present invention may be implemented in a mode in which the first and second identification information and the exchange instructing information are transmitted at a time from the customer-use terminal unit to the central unit, and the exchange is immediately performed.

As described in detail above, in the point managing method, point managing system, central unit and recording medium of the present invention, since the user can effectively use valuable points by exchanging the valuable points for communication points according to a preset exchange rate, it is possible to accelerate the spread of communication points, and consequently the first business entity can obtain new customers and achieve an improvement in the frequency in use of services. Moreover, by introducing a business mode in which the second business entity pays the first business entity the charge for services according to the exchange rate, it is possible for the second business entity to limit the profits derived from the expiration of the term of validity of valuable points on an account book, thereby producing such an advantageous effect that the second business entity does not have disadvantages from the viewpoint of the taxation system.

Furthermore, in the present invention, by performing authentication based on the first identification information given to the customer by the first business entity to ensure safety and then transmitting to the central unit the second identification information given to the customer from the second business entity, it is possible to confirm the status of obtained valuable points corresponding to the second identification information and exchange the valuable points for communication points. It is therefore possible to manage the valuable points unitarily through the central unit, improve the customer's convenience and prevent the valuable points from falling into oblivion.

As this invention may be embodied in several forms without departing from the spirit of essential characteristics thereof, the present embodiment(s) is(are) therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A point managing method for managing points among a first business entity, plural second business entities each of which has a business arrangement with said first business entity, and customers of the first and second business entities, said first business entity managing communication points that are capable of being exchanged by customers for on-line obtaining of goods or services, said second business entities managing value points given to customers as a reward for consumption activity, where the second business entities have already given value points to a customer as part of transactions completed before the customer uses said method, said method comprising:

interactively instructing said first business entity to exchange value points for communication points, where the customer does the instructing;

responsive to and in accordance with the instructing, automatically requesting said second business entity to send the value points already given to the customer;

responsive to the requesting, automatically sending the requested already given value points from said second business entity to said first business entity; and responsive to receiving the value points, exchanging the received value points of each said second business entity for communication points according to preset exchange rates, each corresponding to a respective second business entity, whereby the exchanged-for communication points become available to the customer for on-line obtaining of goods or services via the first business entity.

2. A method according to claim 1, wherein the business arrangement of each second business entity comprises a contract between such second business entity and the first business entity, wherein the contract is for exchanging value points for communication points.

3. A point managing system comprising a central unit for managing communication points used for obtaining on-line services, a cooperate-use terminal unit that is connected to said central unit and manages value points of plural second business entities representing an already-given reward for prior consumption activity with the same, and a customer-use terminal unit that is connected to said central unit, wherein said customer-use terminal unit comprises a controller capable of performing the operation of transmitting to said central unit exchange instructing information instructing an exchange of value points for communication points, said central unit comprises:

a communication point database that records information related to communication points;

an exchange database that records information of an exchange rate between communication points and value points for each second business entity; and a controller capable of performing the operation of transmitting to said cooperate-use terminal unit value point request information requesting value points corresponding to the customer-use terminal unit according to received exchange instructing information; and said cooperate-use terminal unit comprises:

a value point database that records information of value points;

a controller capable of performing operations comprising:

transmitting to said central unit value points; corresponding to received value point request information; and updating the value point database according to the transmitted value points; and said controller of the central unit further capable of performing operations comprising:

exchanging received value points for communication points of a first business entity according to an exchange rate recorded in said exchange database where the exchange rate corresponds to a second business entity that previously issued the exchanging value points; and updating said communication point database according to the exchanged communication points, whereby the exchanged-for communication points become available to the customer for on-line obtaining of goods or services via the first business entity.

4. The point managing system as set forth in claim 3, wherein said controller of the customer-use terminal unit further capable of performing following operations:

accepting input of first identification information related to customers and second identification information that is different from said first identification information; and transmitting said first and second identification information to said central unit;

said controller of the central unit further capable of performing the following operations:

authenticating said customer-use terminal unit based on received first identification information; and transmitting received second identification information to said cooperate-use terminal unit;

said value point database provided in said cooperate-use terminal unit stores value points recorded to correspond to the second identification information; and said controller of the cooperate-use terminal unit further capable of performing the operation of extracting from the value point database value points to be transmitted to said central unit, according to received second identification information.

5. A computer readable recording medium including thereon a recorded computer program for causing a computer having communication means to manage communication points used for on-line services, comprising:

computer readable program code, when receiving exchange instructing information instructing an exchange of value points of plural second business entities representing an already-given reward for consumption activity with the same for communication points, causing a computer to transmit point request information requesting value points to said communication means corresponding to the requested value points, according to said exchange instructing information; and computer readable program code means, when value points corresponding to the transmitted value point request information are received, causing a computer to exchange the received value points for communication points according to a preset exchange rate, where the exchange rate corresponds to a second business entity that previously issued the exchanging value points, and whereby the exchanged-for communication points become available to the customer for on-line obtaining of goods or services via the first business entity.

6. A method of exchanging points between different business entities, comprising:

responsive to a customer purchasing goods or services from first business entities that offer various types of goods or services, automatically crediting to the customer non-monetary first points of types issued by the first business entities, where the first business entities agree to, upon conditions, redeem to the customer the credited non-monetary first points in exchange for any of the goods or services of the various types offered by the first business entities; and after crediting the first points, in response to an interactive request of the customer, exchanging the credited non-monetary first points for non-monetary second points of a type issued by a second business entity which are credited to the customer, where the second business entity agrees to, upon conditions, redeem to the customer the credited non-monetary second points in exchange for any of goods or services of various types offered by the second business entity, where the first points and the second points are of types that are not fungible.

7. A method according to claim 6, wherein the exchanging further comprises de-crediting the first points from the customer.

8. A method according to claim 6, wherein each first business entity has an exchange rate, and wherein the first points and second points are exchanged according to electronic exchange rate information of a first business entity who issued the first points being exchanged.

9. A method according to claim 6, wherein the first points are only directly redeemable by the first business entity, and wherein the second points are only directly redeemable by the second business entity.

10. A central unit connected to a cooperate-use terminal unit for managing value points of plural second business entities representing an already-given reward for prior consumption activity with the same, and a customer-use terminal unit, for managing communication points used for on-line services, comprising:

a communication point database that records information related to communication points;

an exchange database that records information related to of an exchange rate between communication points and value points for each second business entity; and a controller, coupled to said communication point database and said exchange database, and capable of performing operations comprising:

when exchange instructing information instructing an exchange of value points for communication points is received, for transmitting to said cooperate-use terminal unit value point request information requesting value points corresponding to the customer-use terminal unit according to the received exchange instructing information;

when value points corresponding to the transmitted value point information are received, for exchanging the received value points for communication points of a first business entity according to an exchange rate recorded in said exchange database where the exchange rate corresponds to a second business entity that previously issued the exchanging value points; and updating said communication point database according to the exchanged communication points whereby the exchanged-for communication points become available to the customer for on-line obtaining of goods or services via the first business entity.

* * * * *

(12) INTER PARTES REEXAMINATION CERTIFICATE (0380th)
United States Patent
Sakakibara

(10) Number: US 6,721,743 C1
(45) Certificate Issued: May 22, 2012

(54) VALUE POINTS EXCHANGING MANAGING METHOD AMONG FIRST AND SECOND BUSINESS ENTITIES WHERE VALUE POINTS AVAILABLE TO ON-LINE CUSTOMER OBTAINING GOODS OR SERVICES

(75) Inventor: Hisashi Sakakibara, Osaka (JP)

(73) Assignee: A.D. Ken Corporation, Osaka (JP)

Reexamination Request:
No. 95/000,043, May 26, 2004

Reexamination Certificate for:
Patent No.: 6,721,743
Issued: Apr. 13, 2004
Appl. No.: 09/632,586
Filed: Aug. 4, 2000

(30) Foreign Application Priority Data

Mar. 24, 2000 (JP) .................................... 2000-085057

(51) Int. Cl.
*G06F 17/30* (2006.01)
*G07G 1/12* (2006.01)
*H04L 12/28* (2006.01)

(52) U.S. Cl. ..................... 707/1; 705/14.27; 705/14.35; 705/37; 705/39; 707/999.01; 707/999.102; 709/217

(58) Field of Classification Search ......................... None
See application file for complete search history.

(56) References Cited

To view the complete listing of prior art documents cited during the proceeding for Reexamination Control Number 95/000,043, please refer to the USPTO's public Patent Application Information Retrieval (PAIR) system under the Display References tab.

*Primary Examiner* — Luke S Wassum

(57) ABSTRACT

A customer-use terminal unit 20 managed by a customer transmits exchange instructing information, which instructs an exchange of valuable points obtained by the customer for communication points used for receiving on-line services, to a central unit 10 that manages the communication points (S202). The central unit 10 transmits valuable point request information according to the received exchange instructing information to a cooperate-use terminal unit 30 that manages the valuable points (S204). The cooperate-use terminal unit 30 transmits valuable points corresponding to the received valuable point request information to the central unit 10 (S206). The central unit 10 exchanges the received valuable points for communication points according to a predetermined exchange rate (S209). Accordingly, it is possible to achieve point management capable of reducing the loss of valuable points given to the customer as a reward for consumption activity, due to the expiration of the term of validity of the valuable points, and improving the frequency in use of on-line services.

At the time of issuance and publication of this certificate, the patent remains subject to pending reissue application number 11/402,336 filed Apr. 12, 2006. The claim content of the patent may be subsequently revised if a reissue patent is issued from the reissue application.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *